(12) United States Patent  
Jang

(10) Patent No.: US 6,816,324 B2
(45) Date of Patent: Nov. 9, 2004

(54) PROJECTION LENS APPARATUS FOR A PROJECTOR AND METHOD OF ASSEMBLING SAME

(75) Inventor: Kyoung-choul Jang, Suwon (KR)

(73) Assignee: Samsung Electronics Co., Ltd., Gyunggi-do (KR)

( * ) Notice: Subject to any disclaimer, the term of this patent is extended or adjusted under 35 U.S.C. 154(b) by 0 days.

(21) Appl. No.: 10/619,504

(22) Filed: Jul. 16, 2003

(65) Prior Publication Data

US 2004/0021959 A1 Feb. 5, 2004

(30) Foreign Application Priority Data

Jul. 26, 2002 (KR) .............................. 20-2002-0022419

(51) Int. Cl.[7] .................................................. G02B 7/02
(52) U.S. Cl. ...................................... 359/819; 359/827
(58) Field of Search .............................. 359/811, 819, 359/822, 823, 827, 694, 699

(56) References Cited

U.S. PATENT DOCUMENTS 6,661,589 B2 * 12/2003 Takanashi et al. .......... 359/819

2002/0067558 A1 * 6/2002 Miyakawa .................. 359/819
2004/0027692 A1 * 2/2004 Hoshide et al. ............. 359/827

* cited by examiner

Primary Examiner—Georgia Epps
Assistant Examiner—M. Hasan
(74) Attorney, Agent, or Firm—Sughrue Mion, PLLC

(57) ABSTRACT

A projection lens apparatus of a projector and a method of assembling same has a main lens barrel provided with a first projection lens that expands and projects an image that is incident thereto, and a reflection group that reflects the incident image towards the first projection lens group, a rear lens barrel provided with a second reflection group that projects the incident image towards the reflection group, the rear lens barrel being connected to the main lens barrel to move forward and backward to adjust an optical axis of the image as projected, and a pressing mechanism elastically pressing the rear lens barrel with respect to the main lens barrel in the direction of optical axis, thereby maintaining the rear lens barrel at a predetermined position so that the second projection lens group is not deviated from the optical axis.

10 Claims, 4 Drawing Sheets

PROJECTION LENS APPARATUS FOR A PROJECTOR AND METHOD OF ASSEMBLING SAME

BACKGROUND OF THE INVENTION

This application claims the priority of Korean Utility Model Application No. 2002-22419, filed Jul. 26, 2002 in the Korean Intellectual Property Office, which is incorporated herein by reference in its entirety.

1. Field of the Invention

The present invention relates to a projection lens apparatus for a projector and a method of assembling same.

2. Description of the Related Art

With the development of information technology, and in order to satisfy people's demands to observe an image on a large-scale screen, an image projecting apparatus, for example, an image projection apparatus using a liquid crystal display, is in growing demand.

An image projecting apparatus generally includes a projector for generating, expanding and projecting an image on a screen. According to the way of projection, the image projecting apparatus is usually categorized into a rear projection type or a front projection type.

FIG. 1 shows a rear projection type image projecting apparatus, which includes a cabinet 1 on which a screen 2 is mounted, a projector 3 mounted in the cabinet 1, and a reflective mirror 4 for reflecting the image emitted from the projector 3 towards the rear side of the screen 2.

The projector 3 includes a light source 11 for generating light, an image generating unit 12 for generating an image with the light, and a projection lens group 13 having a plurality of projection lenses for expanding and projecting the generated image towards the reflective mirror 4. The projection lens group 13 includes a first projection lens group 14 positioned in the proximity of the image generating unit 12, a second projection lens group 15 for expanding and projecting the image, and a reflection group 16 for reflecting the image passed through the first projection lens group 14 towards the second projection lens group 15. The second projection lens group 15 and the reflection group 16 are altogether secured in a main lens barrel 17 of a predetermined shape (FIG. 2). The first projection lens group 14 is supported on a rear lens barrel 18 to be movable forward and backward with respect to the main lens barrel 17, thereby adjusting the focus of image projected against the screen 2. In assembling the projection lens group 13, the rear lens barrel 18 is rotated to be moved forward and backward within and without the main lens barrel 17 so that the focus can be precisely adjusted. Then the rear lens barrel 18 is fixed in the main lens barrel 17.

The rear lens barrel 18 may be fixed in the main lens barrel 17 with adhesives such as a bond, or alternatively, with screws which are passed through the main lens barrel 17 and fastened to one side of the rear lens barrel 18. During such a fixing, however, a gap between the rear lens barrel 18 and the main lens barrel 17 hinders precise alignment of the rear lens barrel 18 during forward and backward motion. Even after the fixing, focus sometimes deviates due to the presence of the gap. In the case of using screws, the rear lens barrel 18 is deviated to a side by the pressing of the screws, thus, such a tilt causes degradation in the performance of the projection lens.

SUMMARY OF THE INVENTION

Accordingly, it is an aspect of the present invention to provide a projection lens apparatus of a projector having an improved structure which is capable of maintaining a focus of the projection lens even after assembly.

The above aspect is accomplished by a projection lens apparatus of a projector consistent with the present invention, comprising a main lens barrel comprising a first projection lens group that expands and projects an image that is incident thereto, and a reflection group that reflects the incident image towards the first projection lens group, a rear lens barrel provided with a second reflection group that projects the incident image towards the reflection group, the rear lens barrel being connected to the main lens barrel to move forward and backward to adjust an optical axis of the image as projected, and a pressing mechanism that elastically presses or means for elastically pressing the rear lens barrel with respect to the main lens barrel in the direction of the optical axis, thereby maintaining the rear lens barrel at a predetermined position so that the second projection lens group is not deviated from the optical axis.

The pressing mechanism includes a coil spring disposed within the main lens barrel and wound around an outer circumference of the rear lens barrel, the coil spring being elastically supported in the direction of the optical axis.

The rear lens barrel includes a fastening portion formed on one end, having a thread line on an outer circumference thereof and screw-engaged with an inner circumference of the main lens barrel, and a flange portion formed on the other end with the outer diameter thereof extending. The pressing mechanism includes a coil spring for being engaged around the outer circumference of the rear lens barrel with one end being supported on the flange portion.

The main lens barrel includes a thread line formed in an inner circumference for screw-engagement with the fastening portion of the rear lens barrel, with an inner diameter being stepped to support the other end of the coil spring.

In addition, the pressing mechanism prevents the formation of a gap between the main lens barrel and the rear lens barrel. The rear lens barrel comprises a body portion between said fastening portion and said flange portion. The body portion has a larger diameter then said fastening portion. The flange portion has a greater diameter that the body portion, wherein said flange portion supports one end of said pressing mechanism wound around the body portion.

It is another aspect of the present invention to provide a method of assembling a projection lens apparatus of a projector by screwing a rear lens barrel fitted to a main lens barrel, the method comprising guiding a fastening portion of said rear lens barrel along a thread line of the main lens barrel by rotating the rear lens barrel with respect to the main lens barrel, adjusting the optical axis of a second projection lens group supported on the rear lens barrel, and elastically holding the rear lens barrel with respect to the main lens barrel by compressing a pressing mechanism.

BRIEF DESCRIPTION OF THE DRAWINGS

The above aspects and other features of the present invention will become more apparent by describing in detail an exemplary embodiment thereof with reference to the attached drawings, in which.

DETAILED DESCRIPTION OF AN EXEMPLARY EMBODIMENT

Hereinafter, the present invention will be described in detail with reference to the accompanying drawings.

Figure 3:
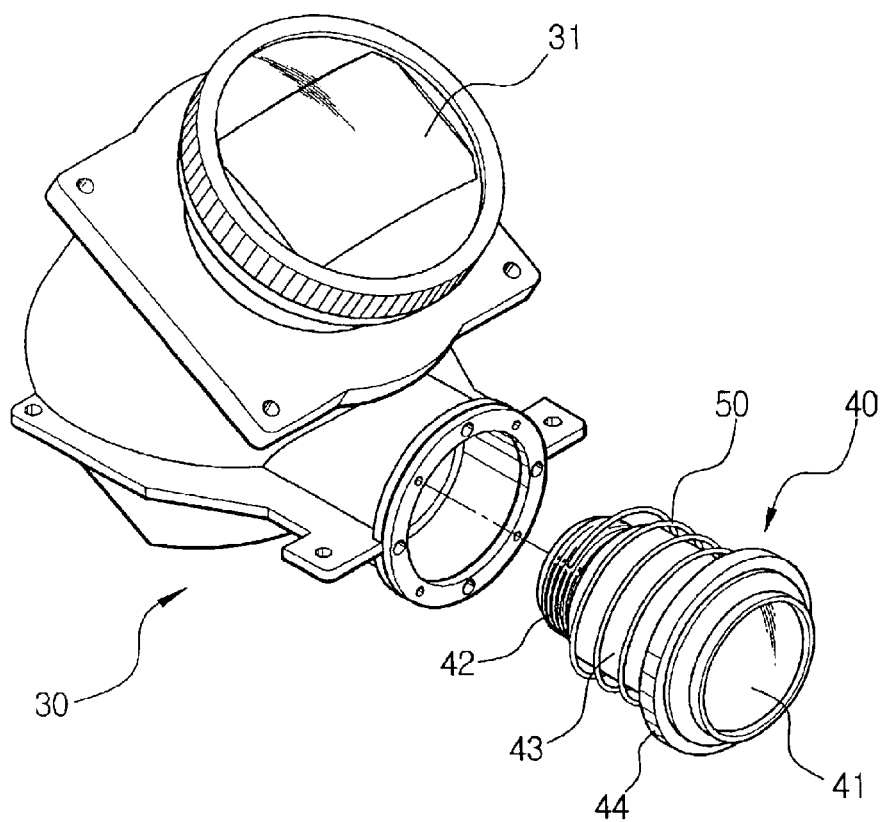
FIG. 3 is an exploded perspective view schematically showing a projection lens apparatus of a projector consistent with an exemplary embodiment of the present invention.

Referring to FIG. 3, the projection lens apparatus consistent with an exemplary embodiment of the present invention includes a main lens barrel 30, a rear lens barrel 40 fixed with the main lens barrel 30, and a pressing mechanism 50.

Figure 1:
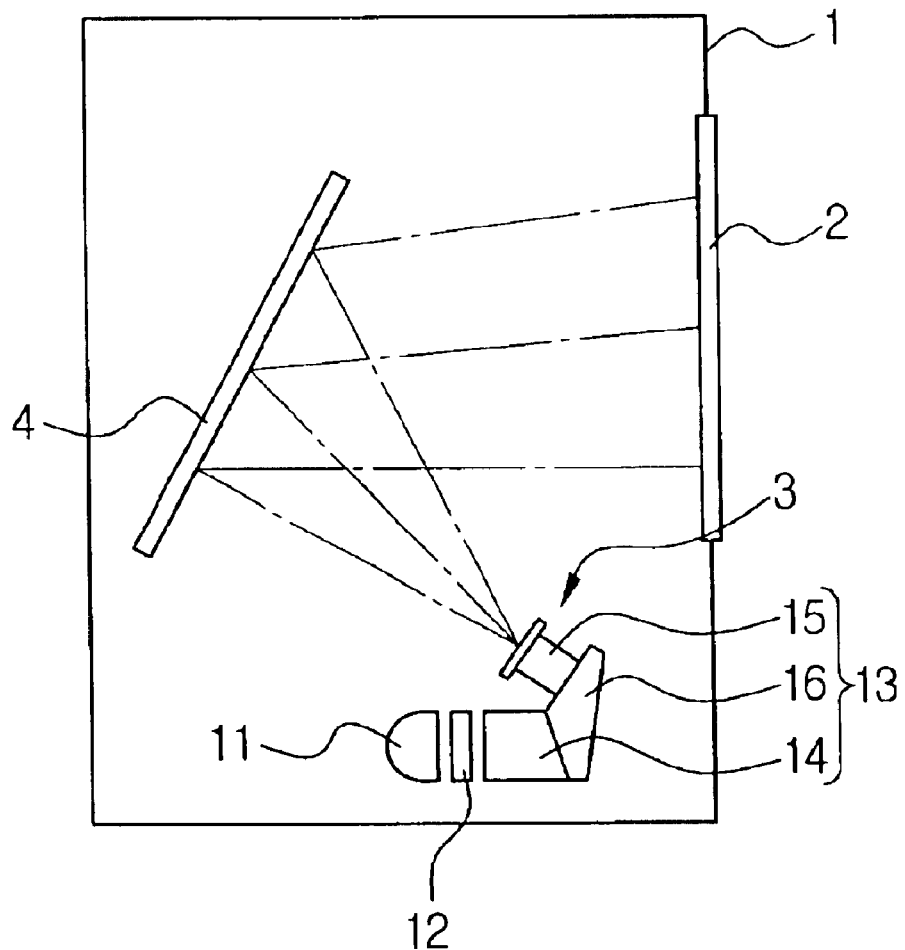
FIG. 1 is a schematic view showing the structure of a conventional rear projection type image projecting apparatus.
Figure 2:
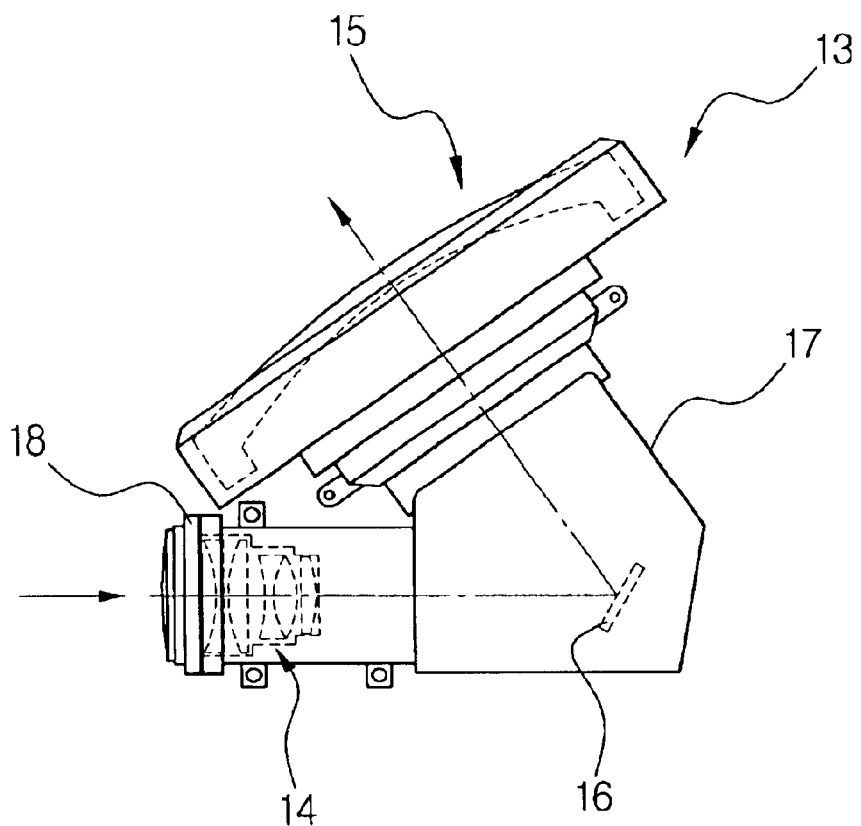
FIG. 2 is a schematic view showing the projector of FIG. 1.

Formed inside of the main lens barrel 30 are a first projection lens group 31 for expanding an image incident thereon and projecting the enlarged image against a screen 2 (FIG. 1), and a reflection group for reflecting the incident image towards the first projection lens group 31. The reflection group is formed in the same manner as that of the reflection group 16 described above with reference to FIG. 2, which is mounted in the main lens barrel 30 at a predetermined slope. The reflection group reflects the incident image towards the first projection lens group 31. The main lens barrel 30 has a space extended therethrough, and the first projection lens group 31 is fixed on the leading end of the main lens barrel 30.

Figure 4:
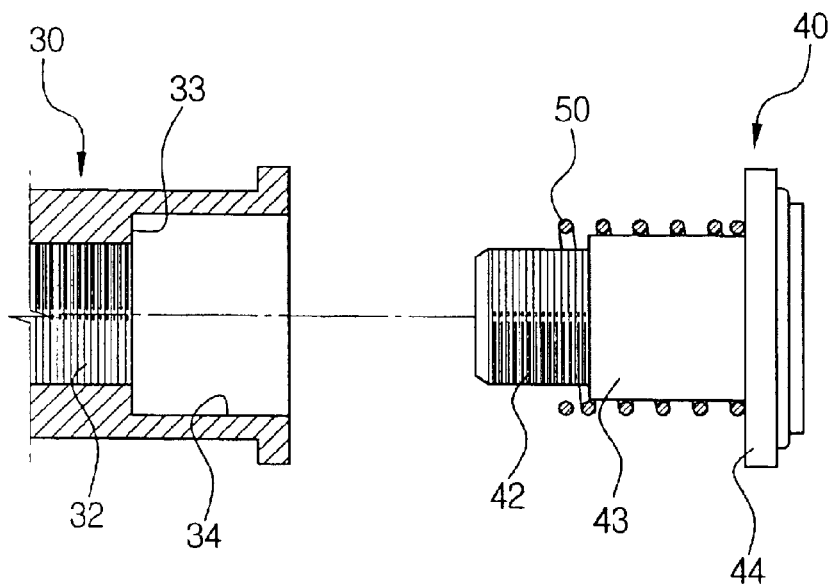
FIG. 4 is a partial sectional view of the projection lens apparatus of the projector consistent with an exemplary embodiment of the present invention.

The rear lens barrel 40 includes a second projection lens group 41 for projecting the image generated at the image generating unit towards the reflection group. The second projection lens group 41 comprises a plurality of lenses, and is fixed in the rear lens barrel 40. The rear lens barrel 40 includes a fastening portion 42 formed on a leading end with a threaded line formed on the outer circumference, a flange portion 44 formed on the other end with its outer diameter extending, and a body portion 43 formed between the fastening portion 42 and the flange portion 44. As shown in FIG. 4, the fastening portion 42 is engaged with the threaded line 32 formed on the inner circumference of the main lens barrel 30. The body portion 43 has a larger outer diameter than the fastening portion 42, and the pressing mechanism 50 is fitted around the body portion 43. The flange portion 44 has a greater diameter than the body portion 43 so as to support one end of the pressing mechanism 50 being fitted around the body portion 43. Then by rotating the rear lens barrel 40 as it is inserted in the main lens barrel 30, the rear lens barrel 40 is engaged with the main lens barrel 30 in a manner of being movable forward and backward by the screw engagement of the fastening portion 42 and the thread line 32. Accordingly, the focus, i.e., the optical axis, can be adjusted by moving the rear lens barrel 40 forward and backward.

The pressing mechanism 50 is provided to maintain the position of the rear lens barrel 40 by elastically pressing the rear lens barrel 40 with respect to the main lens barrel 30 in the direction of the optical axis. Accordingly, the second projection lens group 41 is prevented from deviating from the optical axis. The pressing mechanism 50 includes a coil spring, which is disposed around the inner circumference of the main lens barrel 30 while being fitted around the rear lens barrel 40. One end of the coil spring is supported on the flange portion 44 of the rear lens barrel 40, while the other end thereof is supported on a stepped portion 33 which is formed on the inner circumference of the main lens barrel 30. The outer circumference of the body portion 43 and a large inner diameter portion 34 of the main lens barrel 30 are maintained at a gap larger than the thickness of the coil spring so that the coil spring can be freely compressed and decompressed while it is fitted around the outer circumference of the rear lens barrel 40.

Figure 5:
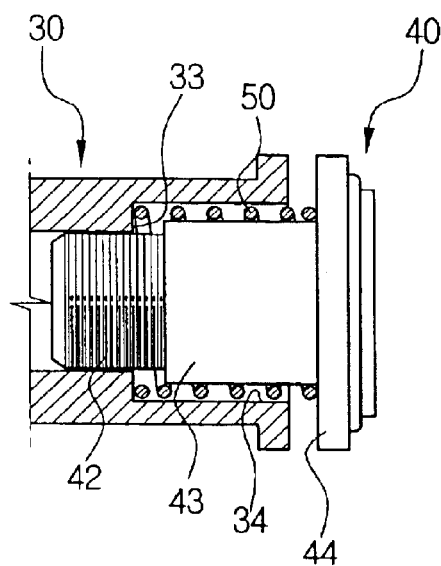
FIG. 5 is a sectional view showing the projection lens apparatus of the projector consistent with the exemplary embodiment of the present invention in an assembly.

In the projection lens apparatus of the projector constructed as above consistent with an exemplary embodiment of the present invention, as shown in FIG. 5, the rear lens barrel 40 is screwed to the main lens barrel 30 while being fitted in the main lens barrel. In other words, the fastening portion 42 of the rear lens barrel 40 is guided along the thread line 32 of the main lens barrel 30 during rotation of the rear lens barrel 40 with respect to the main lens barrel 30, adjusting the optical axis of the second projection lens group 41 supported on the rear lens barrel 40. At this time, the pressing mechanism 50 supported on the stepped portion 33 and the flange portion 44 elastically holds the rear lens barrel 40 with respect to the main lens barrel 30 at a predetermined position while the pressing mechanism 50 is compressed. Accordingly, after a user adjusts the optical axis by moving the rear lens barrel 40 forward and backward, the user releases the rear lens barrel 40. However, the rear lens barrel 40 is still held in place by the recovery force of the pressing mechanism 50 in the direction of the optical axis and does not move during the movement of the projector, or by gravity. Therefore, regardless of the gap that is created between the rear lens barrel 40 and the main lens barrel 30, deviation from the optical axis due to the presence of the gap is prevented by the pressing mechanism 50, and as a result, a clear image without deviation of focus is always obtained.

Further, after the assembly of the rear lens barrel 40 and the adjustment of optical axis, since there is no need to employ fixing means such as adhesives like bonds, or fasteners like screws, and a fixing process, there is a reduction in costs.

With the projection lens apparatus of the projector described above consistent with the present invention, the optical axis is adjusted by screw engaging the rear lens barrel with respect to the main lens barrel. After adjustment of the optical axis, the pressing mechanism disposed between the rear lens barrel and the main lens barrel exerts recovery force towards the direction of the optical axis, maintaining the optical axis as adjusted.

Since there is no need to employ an additional part or process to fix the rear lens barrel in place, cost is reduced, and assembly is simplified.

Further, the optical axis can be adjusted with ease, and maintained as adjusted after the adjustment. As a result, a clear image is always obtainable.

Although the exemplary embodiment of the present invention has been described, it will be understood by those skilled in the art that the present invention should not be limited to the described exemplary embodiment, but various changes and modifications can be made within the spirit and scope of the present invention as defined by the appended claims.

What is claimed is:

1. A projection lens apparatus of a projector, comprising:
   a main lens barrel comprising a first projection lens group that expands and projects an image that is incident thereto, and a reflection group that reflects the incident image towards the first projection lens group;
   a rear lens barrel comprising a second reflection group that projects the incident image towards the reflection group, the rear lens barrel being connected to the main lens barrel to move forward and backward to adjust an optical axis of the image as projected; and a pressing mechanism that elastically presses the rear lens barrel with respect to the main lens barrel in the direction of the optical axis, thereby maintaining the rear lens barrel at a predetermined position so that the second projection lens group is not deviated from the optical axis.

2. The projection lens apparatus of claim 1, wherein the pressing mechanism comprises a coil spring disposed within the main lens barrel and wound around an outer circumference of the rear lens barrel, the coil spring being elastically supported in the direction of the optical axis.

3. The projection lens apparatus of claim 1, wherein the rear lens barrel comprises a fastening portion formed on one end, having a thread line on an outer circumference thereof and screw-engaged with an inner circumference of the main lens barrel, and a flange portion formed on the other end with the outer diameter thereof extending, the pressing mechanism comprising a coil spring for being engaged around the outer circumference of the rear lens barrel with one end being supported on the flange portion.

4. The projection lens apparatus of claim 3, wherein the main lens barrel includes a thread line formed in an inner circumference for screw-engagement with the fastening portion of the rear lens barrel, with an inner diameter being stepped to support the other end of the coil spring.

5. The projection lens apparatus of claim 3, wherein the pressing mechanism prevents the formation of a gap between the main lens barrel and the rear lens barrel.

6. The projection lens apparatus of claim 3, wherein said rear lens barrel comprises a body portion between said fastening portion and said flange portion.

7. The projection lens apparatus of claim 6, wherein said body portion has a larger then said fastening portion.

8. The projection lens apparatus of claim 7, wherein said flange portion has a greater diameter that the body portion, wherein said flange portion supports one end of said pressing mechanism wound around the body portion.

9. A projection lens apparatus of a projector, comprising:

a main lens barrel comprising a first projection lens group that expands and projects an image that is incident thereto, and a reflection group that reflects the incident image towards the first projection lens group;

a rear lens barrel comprising a second reflection group that projects the incident image towards the reflection group, the rear lens barrel being connected to the main lens barrel to move forward and backward to adjust an optical axis of the image as projected; and means for elastically pressing the rear lens barrel with respect to the main lens barrel in the direction of the optical axis, thereby maintaining the rear lens barrel at a predetermined position so that the second projection lens group is not deviated from the optical axis.

10. A method of assembling a projection lens apparatus of a projector by screwing a rear lens barrel fitted to a main lens barrel, said method comprising:

guiding a fastening portion of said rear lens barrel along a thread line of the main lens barrel by rotating the rear lens barrel with respect to the main lens barrel;

adjusting the optical axis of a second projection lens group supported on the rear lens barrel; and elastically holding the rear lens barrel with respect to the main lens barrel by compressing a pressing mechanism.

* * * * *